US012162180B2

(12) United States Patent
Mondich et al.

(10) Patent No.: US 12,162,180 B2
(45) **Date of Patent: *Dec. 10, 2024**

(54) POWER TOOL

(71) Applicant: Black & Decker Inc., New Britain, CT (US)

(72) Inventors: Nicholas A. Mondich, Towson, MD (US); Brent A. Kuehne, Red Lion, PA (US)

(73) Assignee: Black & Decker, Inc., New Britain, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/297,961

(22) Filed: Apr. 10, 2023

(65) Prior Publication Data

US 2023/0241799 A1 Aug. 3, 2023

Related U.S. Application Data

(63) Continuation of application No. 17/344,347, filed on Jun. 10, 2021, now Pat. No. 11,648,704.

(51) Int. Cl.
*B27C 5/10* (2006.01)

(52) U.S. Cl.
CPC .................................... *B27C 5/10* (2013.01)

(58) Field of Classification Search
CPC ...................................................... B27C 5/10
See application file for complete search history.

(56) References Cited

U.S. PATENT DOCUMENTS 8,747,036 B2 * 6/2014 Kato ........................ B25F 5/021
144/136.95
9,333,669 B2 * 5/2016 Okouchi .................. B27C 5/10

* cited by examiner

*Primary Examiner* — Matthew Katcoff
(74) *Attorney, Agent, or Firm* — Rhonda Barton

(57) ABSTRACT

A router incudes a router body and a router base adjustably connected to the router body. A motor is housed in the router body and an output member is driven by the motor. The router base includes a mounting rod, a latching lever and an adjustment lever. The latching lever and the adjustment lever are both mounted on the mounting rod.

20 Claims, 12 Drawing Sheets

POWER TOOL

CROSS-REFERENCE TO RELATED APPLICATIONS

This continuation application claims priority to U.S. patent application Ser. No. 17/344,347 filed on Jun. 10, 2021, entitled POWER TOOL. The entire contents of which are incorporated herein by reference.

FIELD OF THE INVENTION

The present invention relates to power tools.

BACKGROUND

There are various existing power tools. It is desired to provide a power tool with an efficient depth adjustment mechanism.

SUMMARY

According to an aspect of an exemplary embodiment, there is a router. The router includes a router body; a motor housed in the router body; an output member drivable by the motor; and a router base adjustably connected to the router body. wherein the router base includes a mounting rod, a latching lever and an adjustment lever. The latching lever and the adjustment lever may both be mounted on the mounting rod.

The latching lever may be rotatable about a first axis and the adjustment lever is rotatable about a second axis.

The second axis may be transverse to the first axis.

The first axis may be transverse to a longitudinal axis of the mounting rod.

The second axis may be along the longitudinal axis of the rod.

The router body may further include a threaded rod extending along an outer surface of the router body.

The router body may further include an adjustment knob.

The adjustment knob may be connected to the threaded rod and rotation of the adjustment knob causes the threaded rod to rotate.

The adjustment lever may include adjustment lever threads configured to selectively engage the threaded rod.

The adjustment lever may be biased in a direction of the adjustment lever threads engaging with the threaded rod.

The latching lever may be rotatable from a closed position to an open position.

The latching lever may be in the closed position the router base is held in place on the router body.

The latching lever may be in the open position the router base is movable relative to the router body.

The latching lever may be in the closed position it covers a portion of the adjustment lever.

The router base may further include a battery receptacle configured to receive a removable battery pack.

According to another aspect of an exemplary embodiment, there is a router. The router includes a router body; a motor housed in the router body; an output member configured to hold a router bit, the output member being drivable by the motor; and a router base adjustably connected to the router body. The router base includes a latching lever and an adjustment lever. The latching lever is rotatable between a closed position in which the router base is held in place on the router body and an open position in which the router base is movable relative to the router body. The latching lever is transverse to the adjustment lever.

The router base has an upper end and a lower end; the upper end of the router base engages the router body; the lower end of the router base is adjacent to a workpiece; the adjustment lever has a first end and a second end; the second end of the adjustment lever includes threads; and the first end of the adjustment lever is closer to the lower end of the router base than the second end of the adjustment lever is to the router base.

The first end of the adjustment lever may be configured to be actuated by a user to rotate the adjustment lever.

The second end of the adjustment lever may extend above a top of the upper end of the router base.

The first end of the adjustment lever may be below the top of the upper end of the router base.

The router base may further comprise a pair of tabs and a mounting rod extending through the pair of tabs.

The adjustment lever may be mounted on the mounting rod.

The latching lever may be mounted on the mounting rod.

According to another aspect of an exemplary embodiment, there is a router including a router body; a motor housed in the router body; an output member configured to hold a router bit, the output member being drivable by the motor; and a router base adjustably connected to the router body. The router body includes a threaded rod extending along an outside of the router body. The router base includes a latching lever an adjustment lever. The latching lever is rotatable between a closed position in which the router base is held in place on the router body and an open position in which the router base is movable relative to the router body.

The adjustment lever may include threads configured to selectively engage the threaded rod.

The latching lever may partially cover the adjustment lever when the latching lever is in the closed position.

DETAILED DESCRIPTION OF EXEMPLARY EMBODIMENTS OF THE INVENTION

Figure 1:
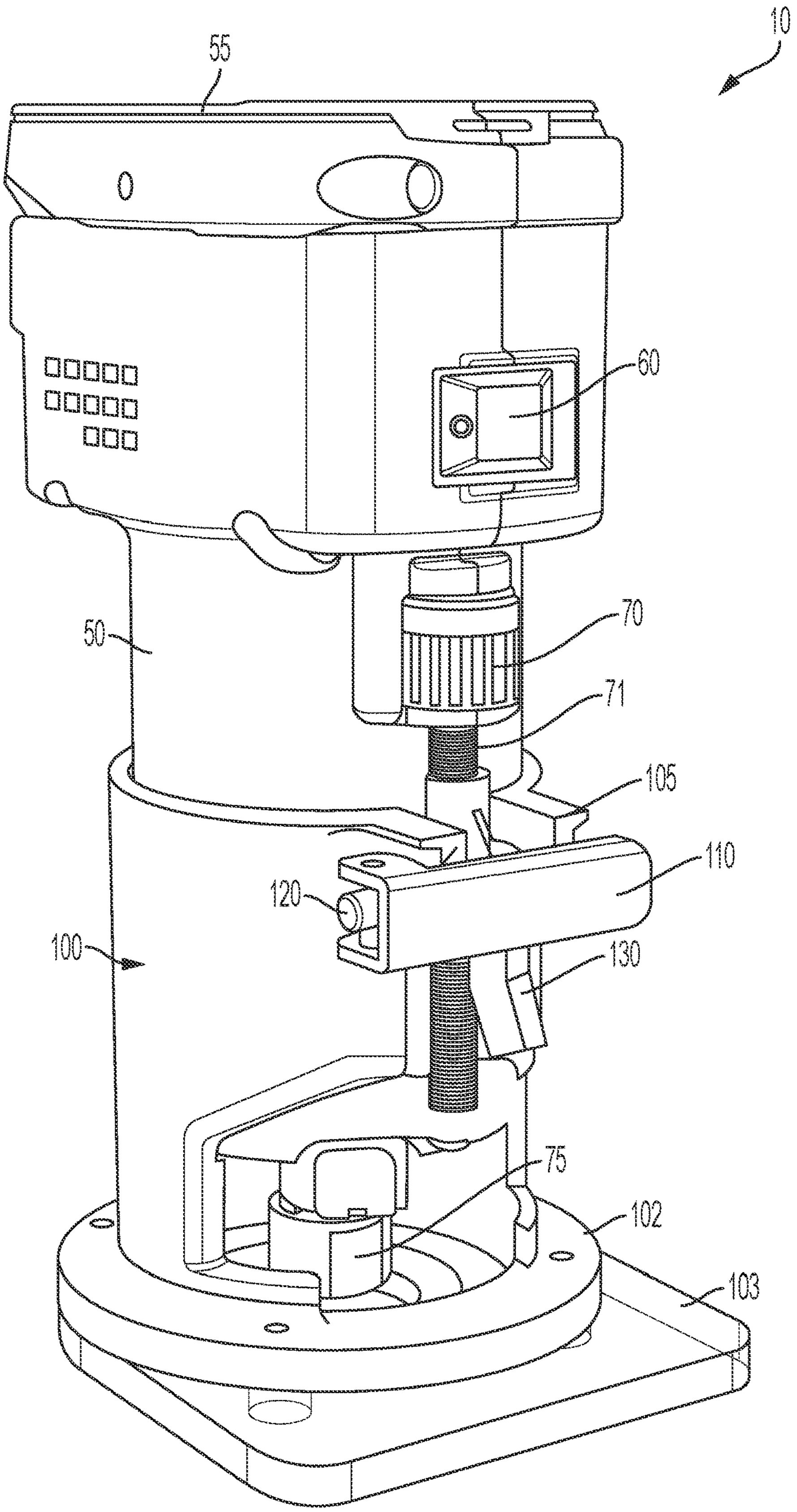
FIG. 1 is a perspective view of an exemplary embodiment of a router.
Figure 2:
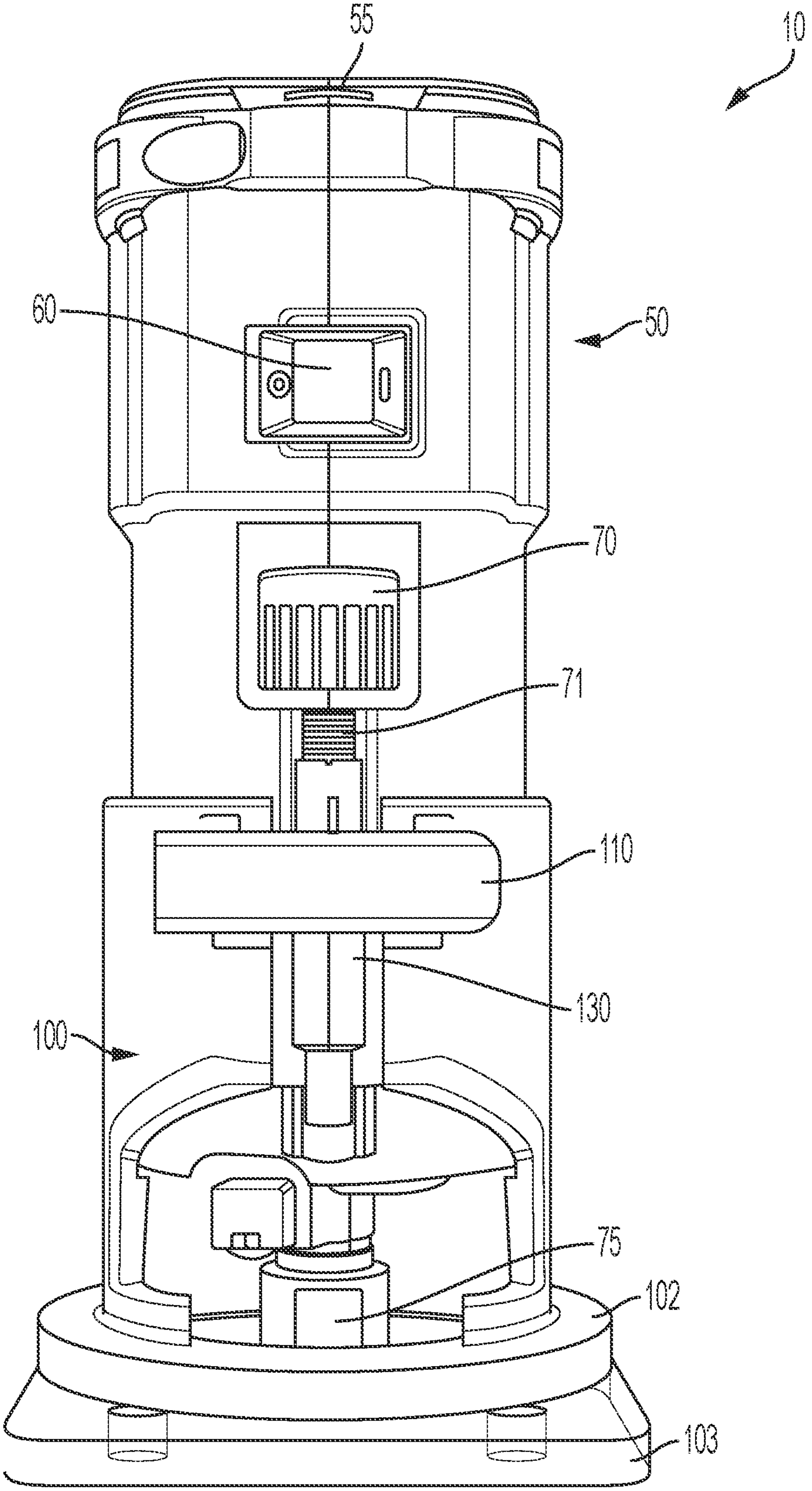
FIG. 2 is front perspective view of the exemplary embodiment of the router.

An exemplary embodiment of a router according to the present application is shown in FIGS. 1-12. FIGS. 1 and 2 illustrate a router 10 including a body 50 assembled with an adjustable base 100. FIG. 1 is a perspective view of the router 10 and FIG. 2 is a front view of the router.

Figure 3:
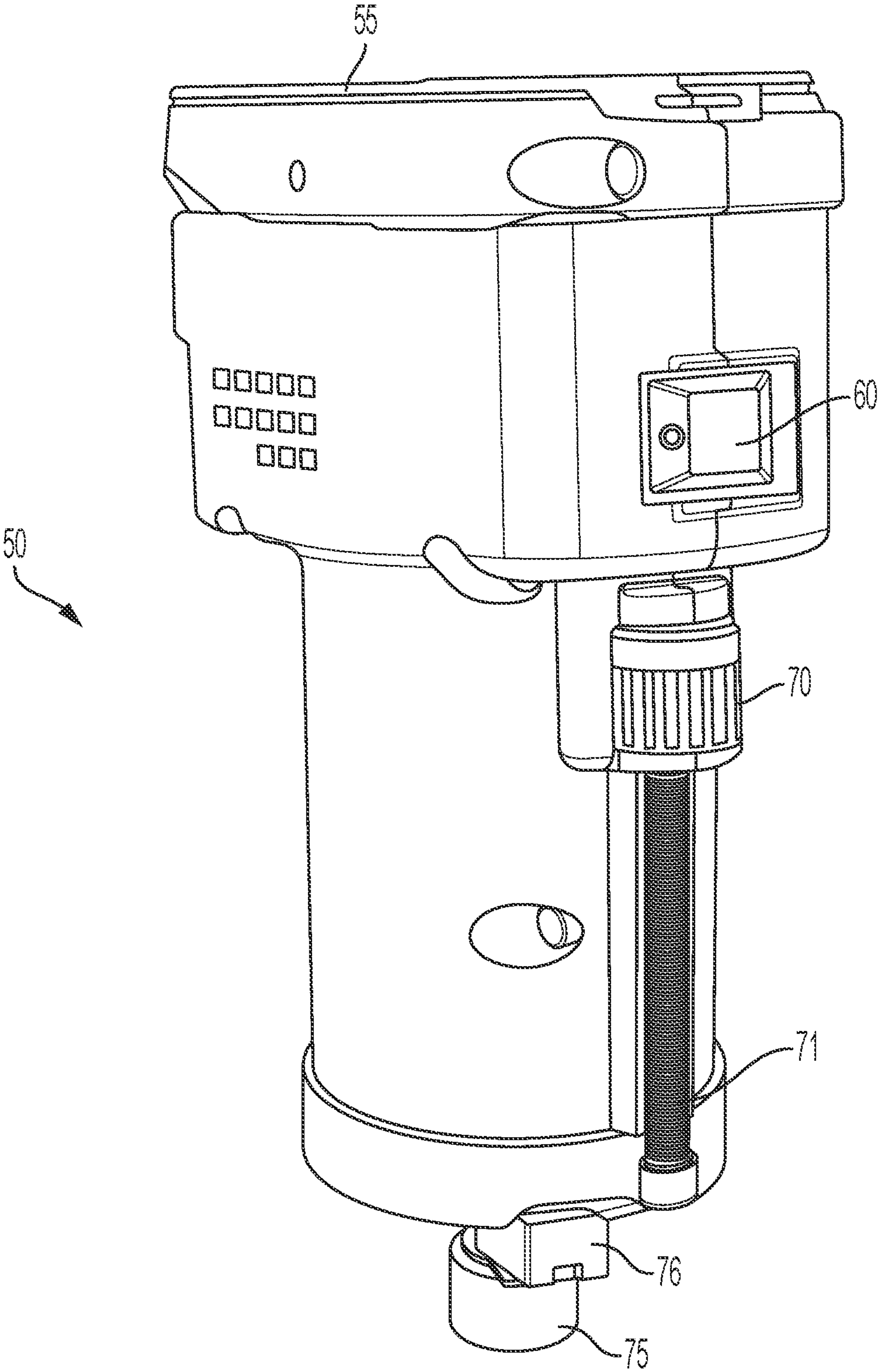
FIG. 3 is a perspective view of an exemplary embodiment of a router body.
Figure 4:
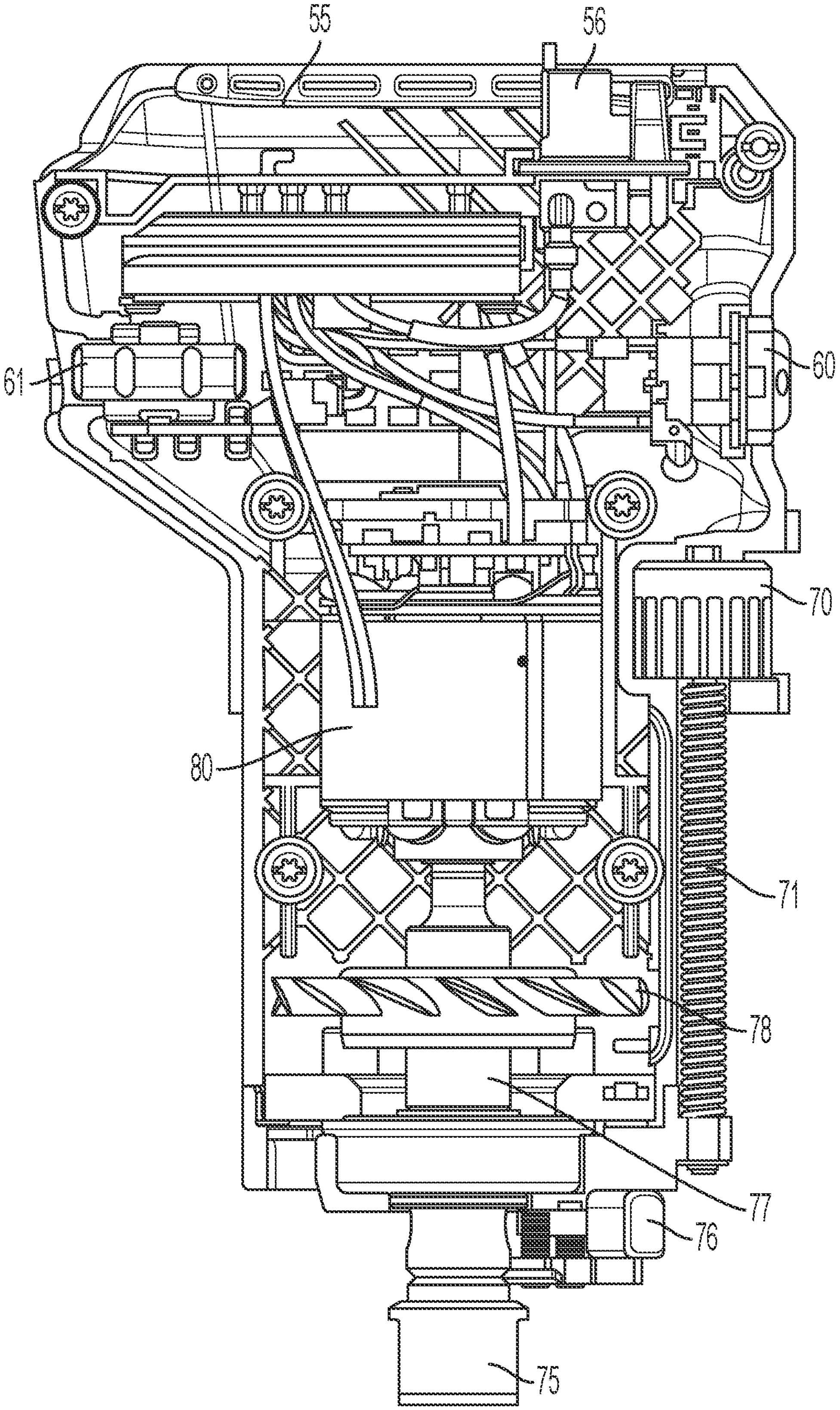
FIG. 4 is a side view of the exemplary embodiment of the router body with the housing partially removed.
Figure 5:
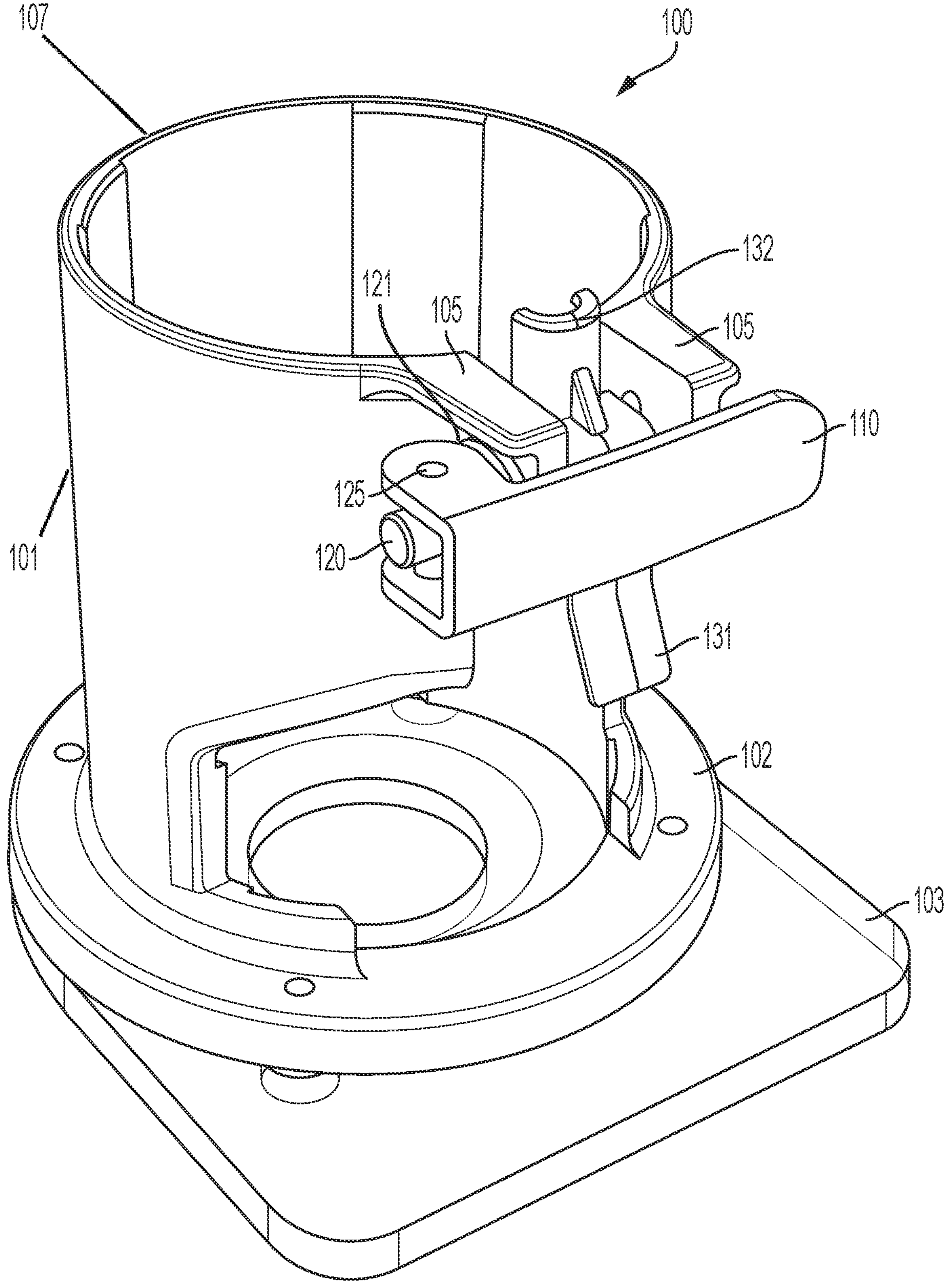
FIG. 5 is a perspective view of an exemplary embodiment of a router base.

FIG. 3 illustrates a perspective view of the router body 50 without the base 100. FIG. 4 illustrates the router body 50 with the housing partially removed to show internal components. FIG. 5 illustrates the base 100 alone.

As shown in FIGS. 1 and 2, the router 10 includes a router body 50 and an adjustable base 100 connected to the router body 50. As shown in FIGS. 1-4, the router body 50 includes a battery receptacle portion 55. The battery receptacle portion 55 is configured to receive the power tool battery pack 200 shown in FIG. 12. The power tool battery pack 200 may be a twenty-volt lithium-ion removable battery pack that is configured to power a variety of tools such as sanders, saws, drills, impact drivers and the like, in addition to the router 10. As shown in FIG. 1, the battery receptacle portion 55 is at a top of the router body 50.

The router body 50 includes a power switch 60. The power switch 60 is used to activate and deactivate the router 10. The router body also includes a depth adjustment knob 70. The depth adjustment knob 70 can be rotated by a user. The depth adjustment knob 70 is connected to a threaded rod 71 so that when a user rotates the depth adjustment knob 70, the threaded rod 71 rotates along with the depth adjustment knob 70. As shown in FIG. 3, for example, the threaded rod 71 extends vertically along the lower length of the router body 50.

As also shown in FIG. 3, the router body 50 includes an output member 75. The output is a router chuck 75 that holds various router bits. The router chuck 75 rotates about a vertical axis when the router 10 is activated so that the motor is activated and drives the chuck 75. The router body 50 also includes a spindle lock 76. The spindle lock 76 can be depressed by a user so that the spindle lock 76 extends into the spindle on which the chuck 75 is mounted. That holds the spindle and chuck 75 in place so that a router bit can be removed or attached to the chuck 75.

FIG. 4 is a side view of the router body 50 with a housing shell removed. As shown in FIG. 4, the battery receptacle portion 55 includes electrical connectors 56 for electrically connecting with the battery pack 200. Wires 57 connect the components such as the electrical connectors 56, motor 80, switch 60 and rotatable dial 61. The dial 61 is rotatable to adjust the speed of the motor 60, as can be done through a potentiometer. As shown in FIG. 4, the router 10 includes a motor 80. When the router 80 is activated, power is provided to the motor 80. The motor drives spindle 77 on which the chuck 75 is mounted so as to rotatably drive the chuck 75 and any router bit held by the chuck 75. As shown in FIG. 4, a fan 78 may be mounted on the spindle 77 in order to provide a cooling effect. As previously discussed, the spindle lock 76 may be pressed to engaged with the spindle 77 and prevent rotation of the spindle 77. The spindle lock 76 is biased by a biasing member away from the spindle 77 and a user must depress the spindle lock 76 and overcome the biasing force to engage it with the spindle 77. The biasing member may be one or more springs.

The adjustable base 100 is shown in various figures, including FIGS. 1, 2, 5 and 6. The adjustable base 100 is configured to be selectively clamped onto the router body 50. As shown, the base 100 includes a cylindrical sleeve 101. At a bottom of the cylindrical sleeve 101, there is a ring 102. The ring 102 is attached to a foot plate 103. The foot plate 103 can be placed on a workpiece, such as a piece of wood. Adjusting the position of the base 100 changes the depth of a cut performed by a router bit driven by the output member 75.

Figure 6:
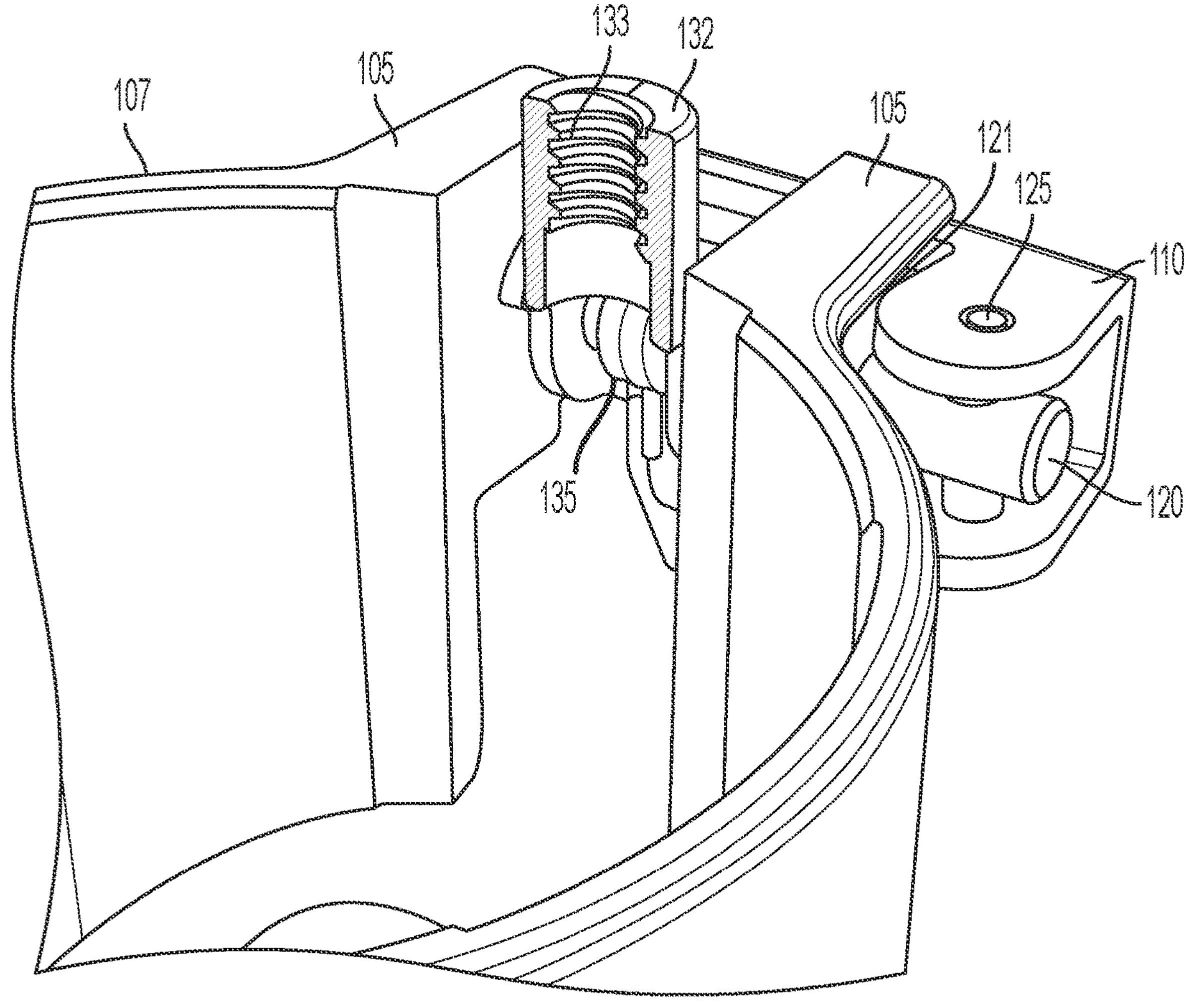
FIG. 6 is a close-up perspective view of an exemplary embodiment of a router base.

As shown in FIGS. 5 and 6, the base 100 includes a rotatable latch lever 110. The sleeve 101 has a pair of projections or tabs 105. A rod 120 extends through holes in the projections 105. One end of the rod includes a vertical through hole and a pin 125 extends through the rod 120 and engages with the lever 110. The lever 110 is rotatable about the pin 125.

A macro-adjustment lever 130 is also mounted on the rod 120. The macro-adjustment lever has a first end 131 configured to be pressed by a user to rotate the lever 130. The second end 132 of the lever 130 is selectively engaged with the threaded rod 71. As shown in FIG. 6, the second end 132 of the lever 130 includes threads 133 for engaging with the threaded rod 71. A torsion spring 135 biases the macro-adjustment lever 130 in a direction of the threads 133 at the second end 132 of the lever 130 into engagement with the threaded rod 71. A user may push on the first end 131 in order to rotate the lever 132 and dis-engage the threads 133 from the threaded rod 71. The latching lever 130 is transverse to the latch lever 110. In the exemplary embodiment, the latching lever 130 is disposed vertically and rotates about a horizontal axis and the latch lever is disposed horizontally and rotates about a vertical axis.

As shown in FIG. 6, the base 100 has an upper end 107. The threads 133 start slightly below the upper end 107 and extend slightly above the upper end 107. The rod 120 and its central axis is below the upper end 107.

Figure 7:
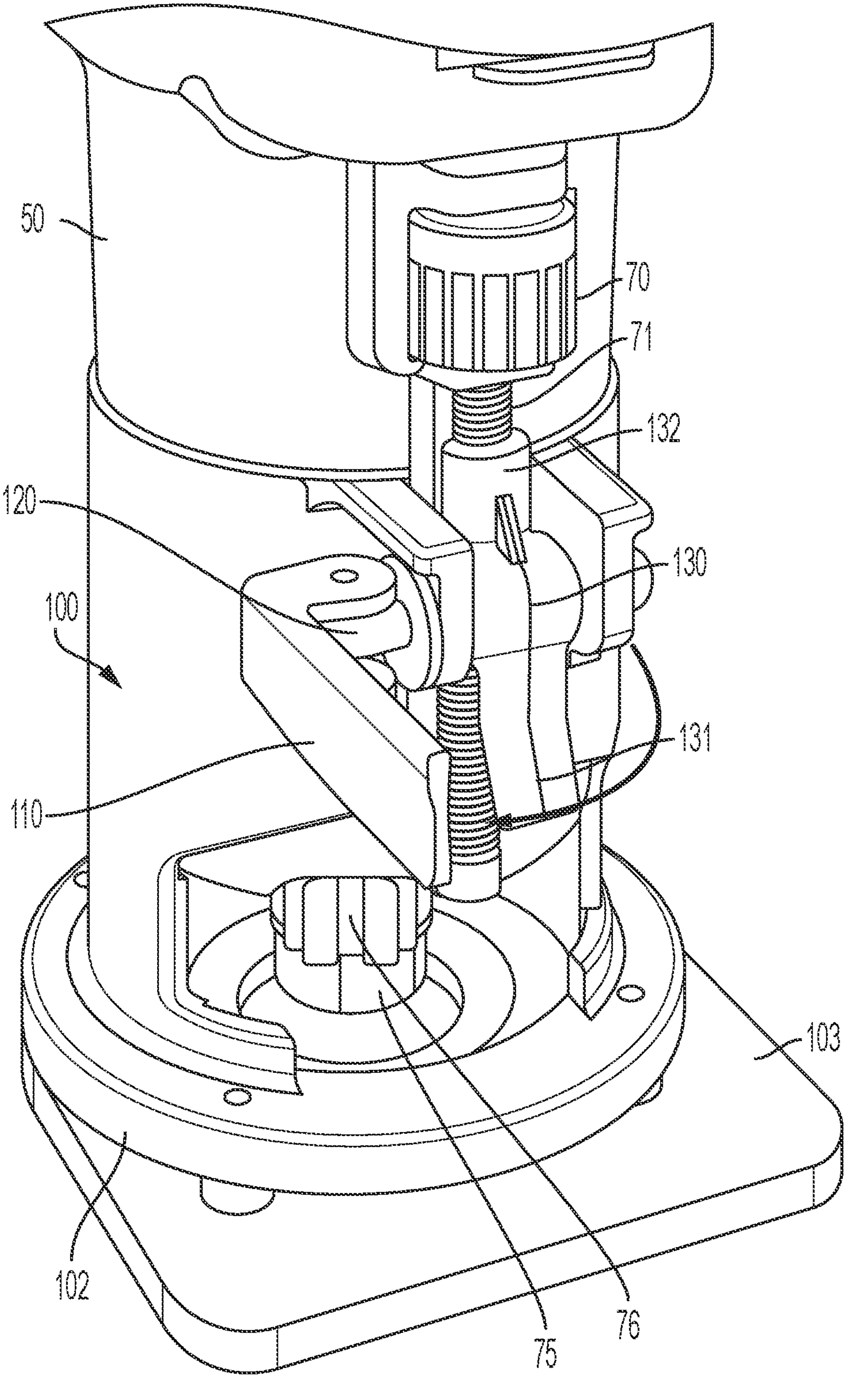
FIG. 7 is a perspective view of the exemplary embodiment of the router.
Figure 8:
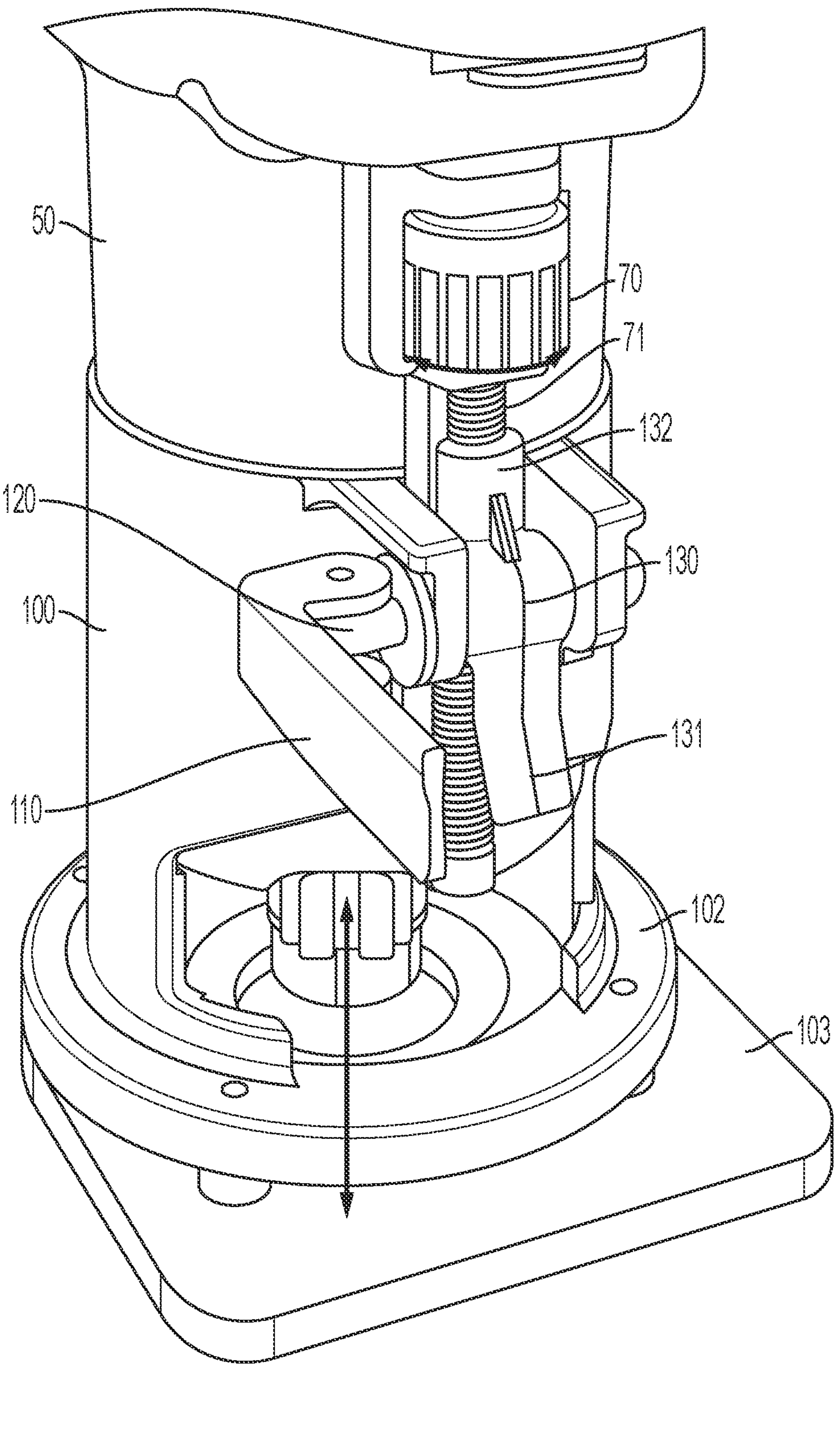
FIG. 8 is another perspective view of the exemplary embodiment of the router.

Operation of the base 100 and its adjustment mechanism will be described with respect to FIGS. 7-11. FIGS. 7 and 8 illustrate operation of micro or fine adjustment of the base 100. As shown in FIG. 7, first, a user opens the latch 110 by rotating it in the direction of the arrow A. A camming surface 121 on the latch 110 is moved away from the tab 105 so that the base 100 is loosened on the router body 50 so that the base is able to be moved up and down. As shown in FIG. 8, the user can then rotate the depth adjustment knob 70 in either direction. As previously discussed, when the depth adjustment knob 70 is rotated, the threaded rod 71 rotates along with the adjustment knob 70. The threaded rod 71 is engaged with the threads 133 at the second end 132 of the lever 130. Because of the engagement of the rod 71 with the threads 133, when the threaded rod 71 is rotated, the base 100 is translated up or down, depending upon the direction of rotation of the depth adjustment knob 70. If the depth adjustment knob 70 is rotated in a first direction, the lever 130, and thus the base 100, is moved downwardly along the threaded rod 71. If the depth adjustment knob 70 is rotated in the other/second direction, the base is moved upwardly along the threaded rod 71. The screw thread allows for fine or micro-adjustments to be made. That is, when the depth adjustment knob 70 is rotated, the screw thread interaction causes relatively small or fine relative movements of the router base 100 relative to the router body 50. This allows a user to precisely adjust the depth. Once the base 100 reaches the appropriate depth, the user can rotate the lever 100 back to the closed position shown in FIGS. 1, 2 and 5. This tightens the base 100 so that it is secured in place on the router body 50. The thread pitch and the size of the depth adjustment knob 70 can be varied to provide an appropriate level of fine adjustment.

Figure 9:
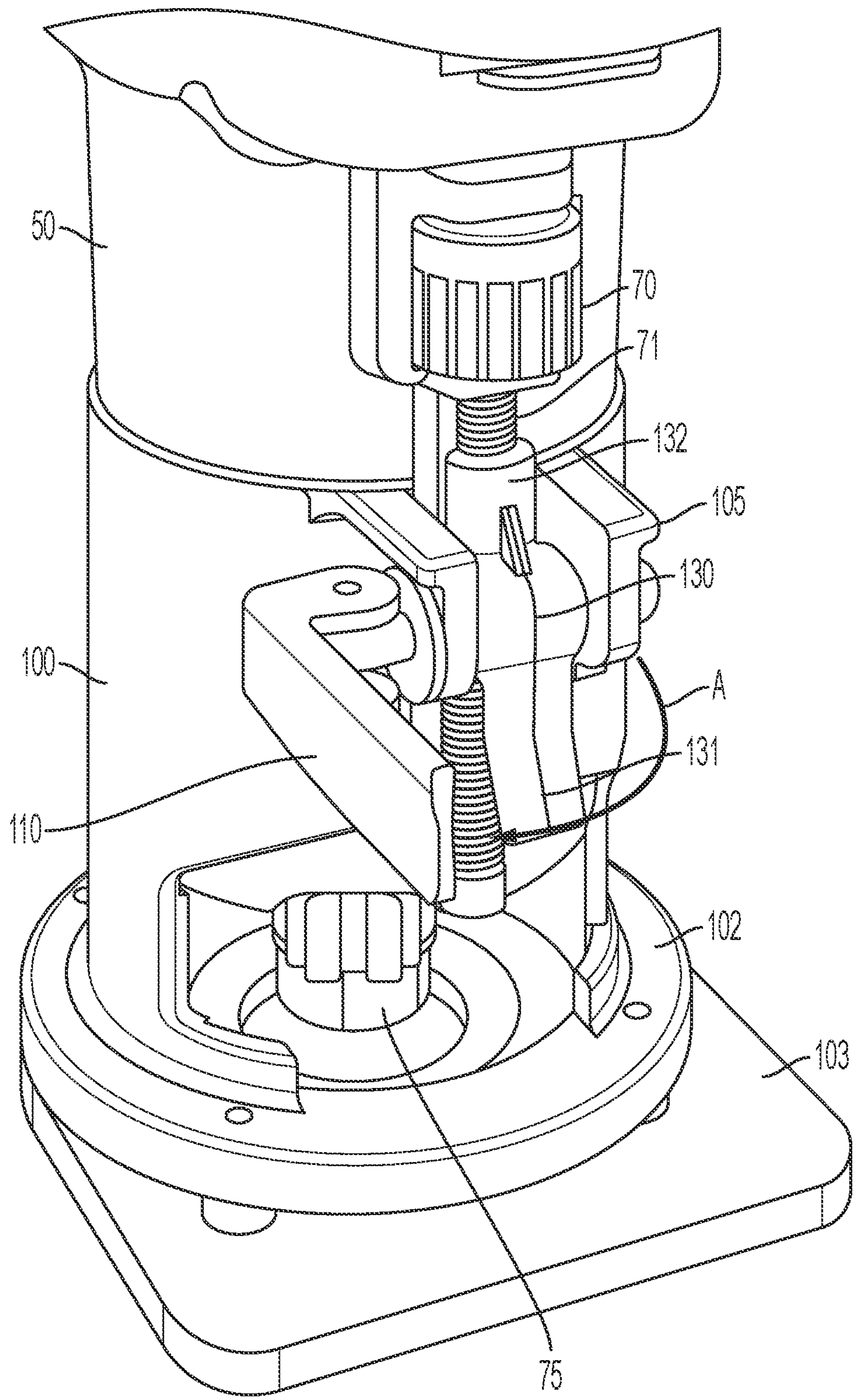
FIG. 9 is another perspective view of the exemplary embodiment of the router.
Figure 10:
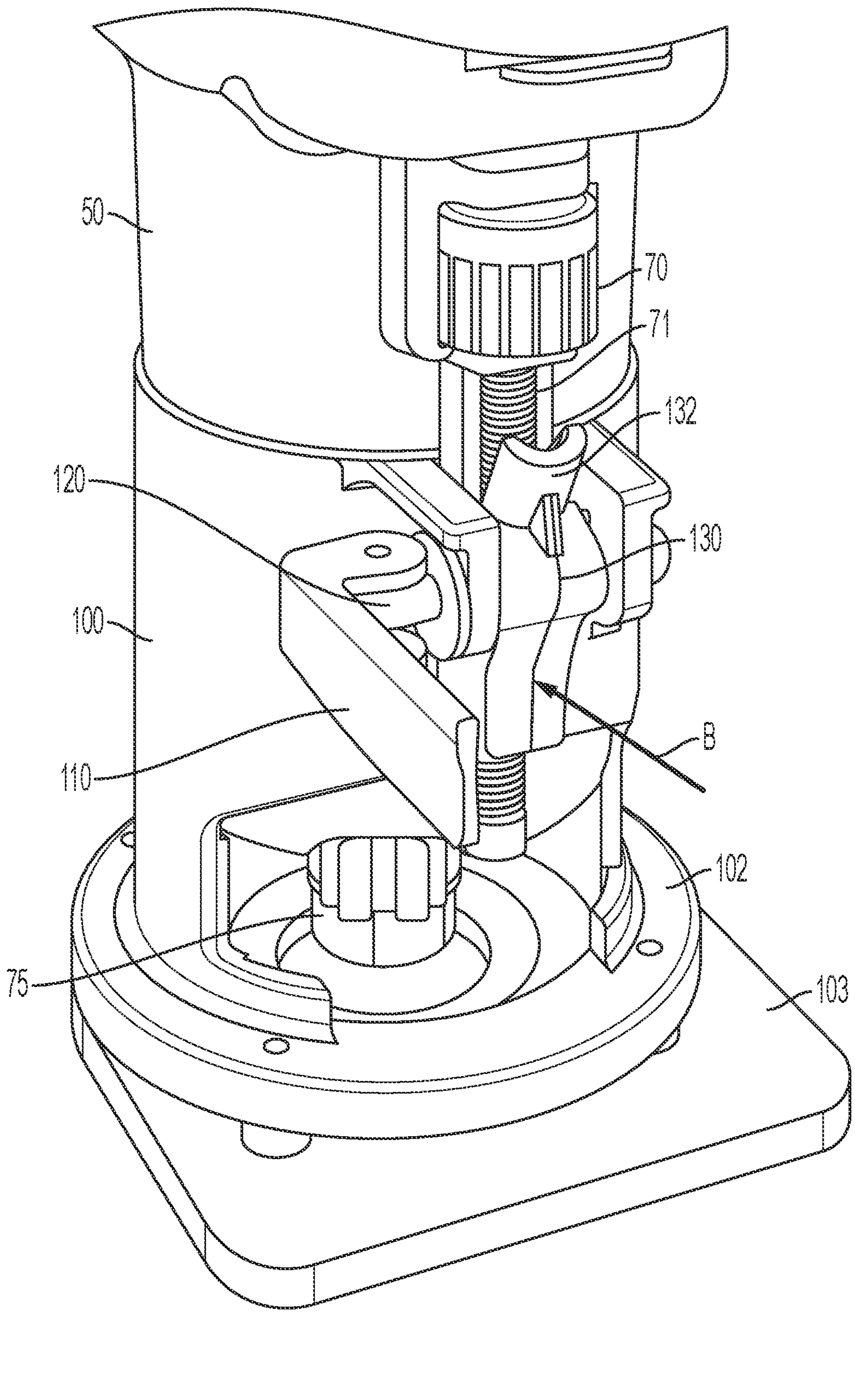
FIG. 10 is another perspective view of the exemplary embodiment of the router
Figure 11:
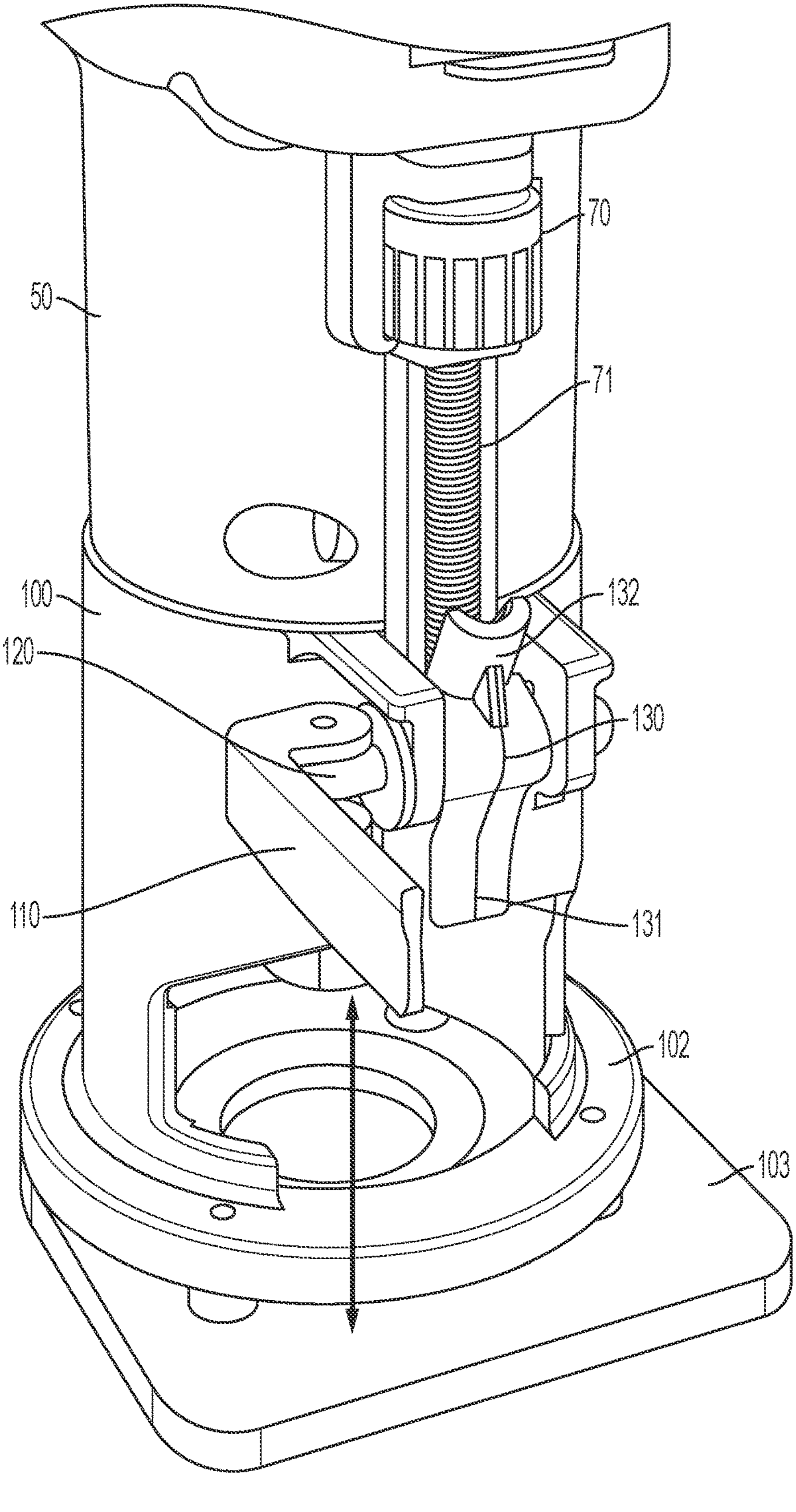
FIG. 11 is another perspective view of the exemplary embodiment of the router.
Figure 12:
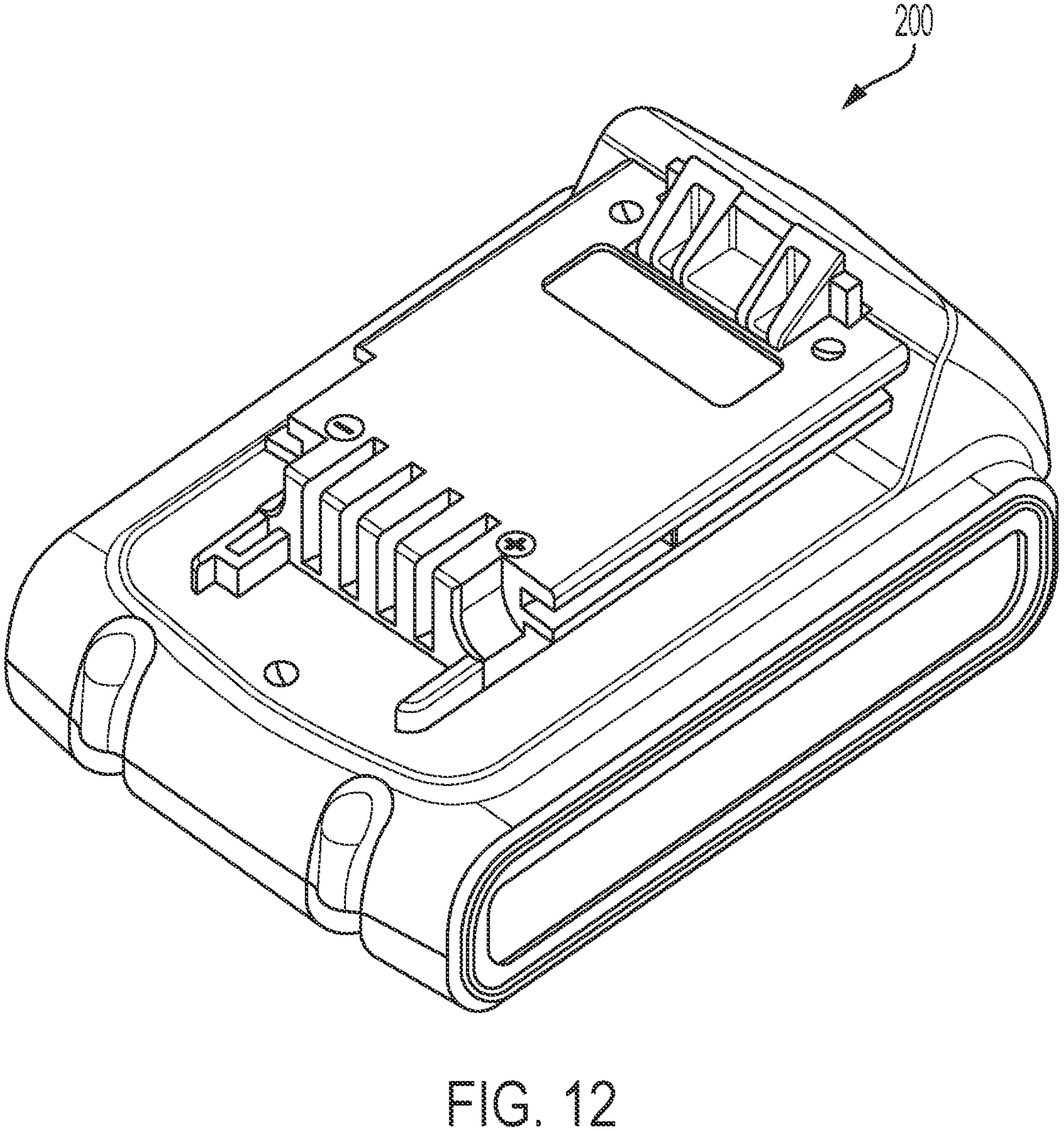
FIG. 12 is a perspective view of an exemplary embodiment of a battery pack.

FIGS. 9-11 illustrate a macro-adjustment of the router base 100 relative to the router body 50. In some instances, a user may wish to change the depth of the router base 100 by a relatively large amount. Using the fine adjustment method of FIGS. 7 and 8 can be slow in such an instance. Macro-adjustment may instead be performed as shown in FIGS. 9-11. As shown in FIG. 9, to begin the macro-adjustment process, the lever 110 must again first be released by rotating it in the direction A to loosen the base 100. Next, as shown in FIG. 10, the first end 131 of the lever 130 is depressed by a user as shown by arrow B. That causes the lever 130 to pivot about the rod 120 so that the second end 132 of the lever 130 including the threads 133 moves away from the threaded rod 71. In particular, the threads 133 are moved out of contact with the threaded rod 71 so that the lever 130 is no longer connected to the threaded rod 71. As shown in FIG. 11, the user may move the base 100 up or down relative to the router body 50. This allows for quick macro adjustments. When the user believes the base 100 is in the correct position or relatively correct position, the user can release the adjustment lever 130 so that it moves back into contact with the threaded rod 71. The user can then, if desired, make micro adjustments using the adjustment knob 70. Once the base 100 is in the desired position, the rotatable latch lever 110 can be rotated back to the locked position shown in FIGS. 1, 2 and 5. This pulls together the projections 105 and tightens the base 100 on the body 50 so that the base 100 is secured in place.

As shown, the latch lever 110 and the adjustment lever 130 both are secured to the same rod 120. This allows for an efficient and compact configuration. Additionally, the latch lever 110 covers a portion of the adjustment lever 130 when the latch lever is in the closed position (e.g., FIGS. 1 and 2).

While the invention has been described by way of exemplary embodiments, it is understood that the words which have been used herein are words of description, rather than words of limitation. Although the description provided above provides detail for the purpose of illustration based on what is currently considered to be the most practical and preferred embodiments, it is to be understood that such detail is solely for that purpose and that the disclosure is not limited to the expressly disclosed embodiments, but, on the contrary, is intended to cover modifications and equivalent arrangements that are within the spirit and scope of the appended claims. It is to be understood that the present disclosure contemplates that, to the extent possible, one or more features of any embodiment can be combined or exchanged with one or more features of any other embodiment.

What is claimed is:

1. A router, comprising:
a router body;
a motor in the router body;
an output member configured to be driven by the motor; and
a router base adjustably connected to the router body;
wherein the router base comprises a mounting rod, a latching lever and an adjustment lever; and
wherein the latching lever is mounted on the mounting rod;
wherein the adjustment lever is mounted on the mounting rod;
wherein the router body comprises a threaded rod extending along an outer surface of the router body; and
wherein the adjustment lever comprises adjustment lever threads configured to selectively engage the threaded rod.

2. The router of claim 1, wherein the latching lever is rotatable about a first axis and the adjustment lever is rotatable about a second axis; and
wherein the second axis is transverse to the first axis.

3. The router of claim 2, wherein the first axis is transverse to a longitudinal axis of the mounting rod.

4. The router of claim 3, wherein the second axis is along the longitudinal axis of the rod.

5. The router of claim 1, wherein the adjustment lever is rotatable about an axis.

6. The router of claim 5, wherein the router body further comprises an adjustment knob.

7. The router of claim 6, wherein the adjustment knob is connected to the threaded rod and rotation of the adjustment knob causes the threaded rod to rotate.

8. The router of claim 7, wherein the router base comprises a cylindrical sleeve, a ring and a foot plate.

9. The router of claim 8, wherein the adjustment lever is biased in a direction of the adjustment lever threads engaging with the threaded rod.

10. The router of claim 9, wherein the latching lever is rotatable from a closed position to an open position;
wherein when the latching lever is in the closed position the router base is held in place on the router body; and
wherein when the latching lever is in the open position the router base is movable relative to the router body.

11. The router of claim 10, wherein when the latching lever is in the closed position it covers a portion of the adjustment lever.

12. The router of claim 1, wherein the router base further comprises a battery receptacle configured to receive a removable battery pack.

13. A router, comprising:
a router body;
a motor housed in the router body;
an output member configured to hold a router bit, the output member being drivable by the motor; and
a router base adjustably connected to the router body;
wherein the router base includes a latching lever and an adjustment lever;
wherein the latching lever is rotatable between a closed position in which the router base is held in place on the router body and an open position in which the router base is movable relative to the router body;
wherein the latching lever is transverse to the adjustment lever;
wherein the router base has an upper end and a lower end;
wherein the upper end of the router base engages the router body;
wherein the lower end of the router base is adjacent to a workpiece;
wherein the adjustment lever has a first end and a second end;
wherein the second end of the adjustment lever comprises threads; and
wherein the first end of the adjustment lever is closer to the lower end of the router base than the second end of the adjustment lever is to the router base
wherein the first end of the adjustment lever is below the top of the upper end of the router base.

14. The router of claim 13, further comprising a threaded rod extending along an outer surface of the router body.

15. The router of claim 13, wherein the first end of the adjustment lever is configured to be actuated by a user to rotate the adjustment lever.

16. The router of claim 13, wherein the second end of the adjustment lever extends above a top of the upper end of the router base.

17. The router of claim 16, further comprising a threaded rod extending along an outer surface of the router body.

18. The router of claim 17, wherein the router base further comprises a pair of tabs and a mounting rod extending through the pair of tabs;

wherein the adjustment lever is mounted on the mounting rod.

19. The router of claim 18, wherein the latching lever is mounted on the mounting rod.

20. A router, comprising:

a router body;

a motor in the router body;

an output member configured to hold a router bit, the output member configured to be driven by the motor;

a router base adjustably connected to the router body, the router base comprising a cylindrical sleeve, a ring and a foot plate;

a threaded rod extending along an outside of the router body;

wherein the router base comprises a latching lever and an adjustment lever;

wherein the latching lever is rotatable between a closed position in which the router base is held in place on the router body and an open position in which the router base is movable relative to the router body;

wherein the latching lever partially covers the adjustment lever when the latching lever is in the closed position.

* * * * *